United States Patent [19]

Moore et al.

[11] Patent Number: 4,459,777

[45] Date of Patent: Jul. 17, 1984

[54] RECIRCULATING ROPE WEEDER

[75] Inventors: John O. Moore, Helena; Frank O. Griffin, West Helena, both of Ark.

[73] Assignee: Sprayrite Manufacturing Company, West Helena, Ark.

[21] Appl. No.: 355,236

[22] Filed: Mar. 5, 1982

[51] Int. Cl.³ .............................................. A01G 13/00
[52] U.S. Cl. ....................................................... 47/1.5
[58] Field of Search ............................ 47/1.5, 1.7, 81; 248/65; 138/40; 239/145

[56] References Cited

U.S. PATENT DOCUMENTS

| | | | |
|---|---|---|---|
| 1,260,914 | 3/1918 | Kline | 41/1.5 |
| 2,213,491 | 9/1940 | Fullilove | 47/1.5 |
| 2,484,615 | 10/1949 | Downs | 248/65 |
| 3,584,787 | 6/1971 | Thomason | 47/1.5 |
| 3,651,600 | 3/1972 | Ewing | 47/1.5 |
| 3,883,324 | 5/1975 | Balla et al. | 138/40 |
| 4,019,278 | 4/1977 | McKirdy | 47/1.5 |
| 4,187,638 | 2/1980 | Hardy et al. | 47/1.5 |
| 4,310,988 | 1/1982 | Porter, Jr. | 239/145 |
| 4,377,920 | 3/1983 | Bowman | 47/1.5 |

Primary Examiner—Bradley M. Lewis
Attorney, Agent, or Firm—Hill, Van Santen, Steadman & Simpson

[57] ABSTRACT

A wick applicator assembly for wiping liquid chemical on vegetation, such as weed growth among young field crops, comprises a tractor-mounted elongated bar having a plurality of individual wick stations arranged serially therealong. Each wick station comprises a porous tube individually connected at one end to a common line containing liquid chemical under pressure and at the other end to a common return line for recycling unused liquid to a supply tank. Each tube is covered with a sleeve of fabric material which becomes saturated with liquid seeping from the tube pores for wiping against target vegetation. Adjustable flow restrictors at the inlet and outlet ends of each tube serve to control the saturation level of its sleeve.

14 Claims, 4 Drawing Figures

RECIRCULATING ROPE WEEDER

BACKGROUND OF THE INVENTION

1. Field of the Invention

This invention relates to apparatus for the contact treatment of vegetation with liquid chemical and, more particularly, to an improved construction for wick-type application of herbicide to weeds growing among farm crops.

2. The Prior Art

At present, wick applicators are widely used for the control of weeds among planted crops. The wick portion of an applicator device is in fluid communication with a supply of liquid herbicide or other chemical such that the wick becomes saturated with the liquid chemical and wipes the liquid chemical onto weeds. The wick portions are mounted on vehicle frame assemblies which can be raised and lowered relative to the ground so that the wicks can be drawn across the crops and adjusted so that the wicks engage the weeds but not the crops as the weeds normally grow higher than the crops in the initial growth stages.

U.S. Pat. Nos. 4,187,638 and 4,019,278 are illustrative of the presently known conventional constructions for field crop wick applicators. U.S. Pat. No. 4,019,278 discloses a pair of spaced and parallel bars which include porous tubes, serving as wick-like devices, arranged in a series flow relation with one another for receiving a supply of liquid herbicide flow therethrough. A portion of the flow of liquid herbicide passes through the walls of the tubes to maintain a film of herbicide on the outer surfaces thereof. The tubes are supported on a height-adjustable framework mounted behind a tractor, so that the tube assembly engages with the tops of the weeds as the tractor is driven through the crop. The film of herbicide coating the outer surfaces of the tubes is thus wiped onto the weeds in a direct application process. A significant disadvantage in this type of wick applicator arrangement is that a failure, such as due to wear erosion, in one of the applicator tubes disrupts the supply flow of herbicide to the downstream tubes, rendering applicator treatment uneven and possibly completely ineffective until the worn tube is detected and can be replaced or repaired. Further drawbacks with this type of arrangement are that the cost of tube replacement is relatively high and that, in many instances, crop treatment with the applicator system is not possible until the worn tube is replaced or repaired.

U.S. Pat. No. 4,187,638 concerns a wick applicator system supported at the end of a height-adjustable framework, wherein the applicator system comprises an extended cylinder serving as a reservoir of liquid herbicide having spaced along the length thereof a plurality of rope pieces with their ends inserted through the reservoir walls and into the reservoir supply. The exterior portions of the ropes become saturated with the liquid chemical due to the capillary flow of liquid from the rope ends. The cylinder is supported at the back of a tractor and drawn across the tops of the weeds whereby the saturated ropes wipe against the weeds. A significant disadvantage with this type of wick applicator system is that a capillary flow of liquid chemical through the ropes does not always assure sufficient saturation of the ropes for adequate treatment of the weeds, especially strong, healthy weeds.

The present invention concerns a novel wick applicator construction which overcomes the above-mentioned drawbacks of heretofore known wick treatment devices. The inventive construction calls for the use of a plurality of wick applicator assemblies arranged along the length of a tractor-mounted framework, wherein the applicator assemblies are in parallel flow relationship and include means for individual wick saturation control and simple individual replacement.

SUMMARY OF THE INVENTION

A transversely extended bar is connected to a height-adjustable framework, preferably supported at the front end of a tractor, for carrying a wick applicator assembly that utilizes a plurality of applicator stations serially arranged along the length of the bar. Each applicator station comprises a hollow perforated tube covered with a sleeve of cloth or rope-like fabric, each tube being connected to an inlet hose at one end and an outlet hose at the opposed other end for directing a flow of liquid chemical therethrough. The tubes are supported in brackets connected to the bar for extending longitudinally of the bar with their lengths overlapping one another. The tube inlet hoses are connected to a common supply pipe receiving a pump-pressurized flow of liquid chemical from a tank. The outlet hoses are connected to a common return pipe for recycling unused portions of liquid chemical through the tubes back to the tank. Pressurization of the liquid chemical passing through the tubes serves to assure sufficient saturation of the tube sleeve surfaces and the cloth or fabric material of the tube sleeves prevents dripping of the liquid chemical onto the field of crops. The applicator station tubes are in parallel flow relationship with one another and replaceable flow restrictors in the inlet and outlet hose connections permits individually adjustable flow control of wick saturation rates.

DESCRIPTION OF THE PREFERRED EMBODIMENT

Figure 1:
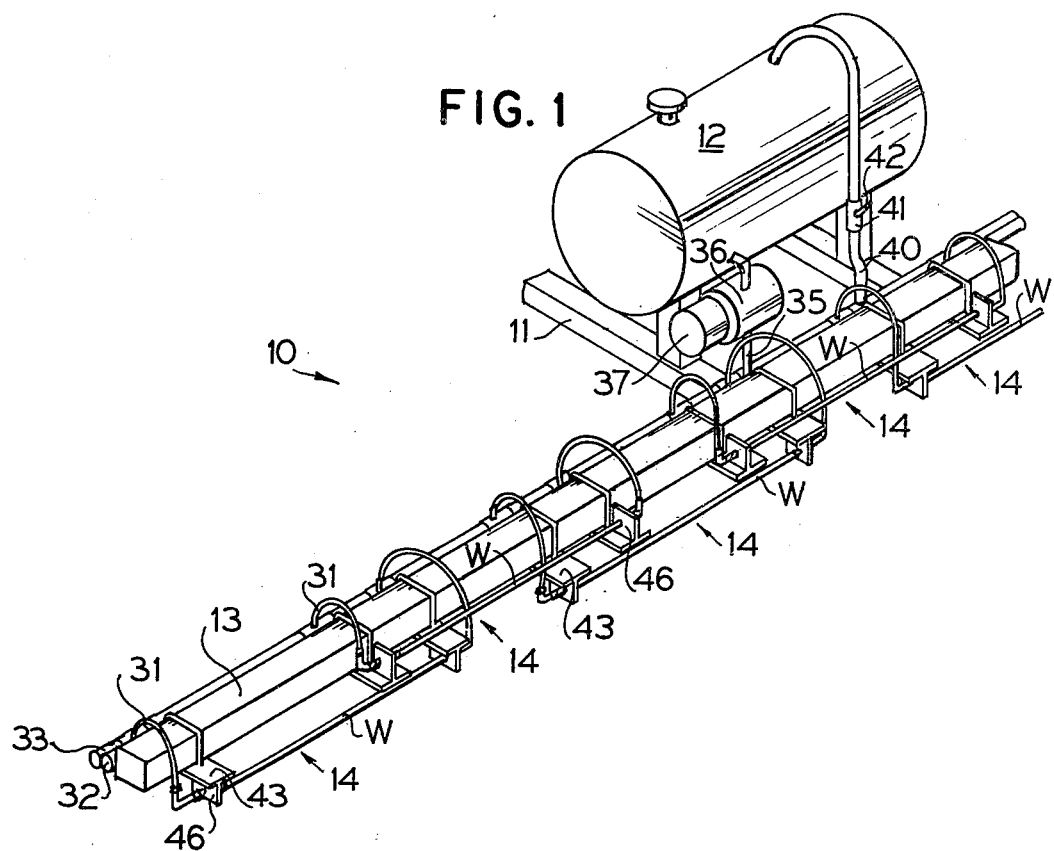
FIG. 1 is a broken-away perspective view of a wick applicator assembly constructed in accordance with the present invention.

With reference to the drawings, and particularly FIG. 1, there is shown a herbicide or weed killer applicator assembly 10 in accordance with this invention. The assembly 10 includes a framework portion 11 preferably arranged for mounting at the front end of a vehicle, such as a tractor and having conventional height adjustment means (not shown). Intermediately of the framework 11, there is supported a relatively large, cylindrical supply tank 12 for containing a supply of liquid chemical herbicide. At the front end of the framework 11, there is mounted an elongated, transversely extending support bar 13 along which are disposed a series of length-wise overlapping wick applicator stations 14.

Figure 2:
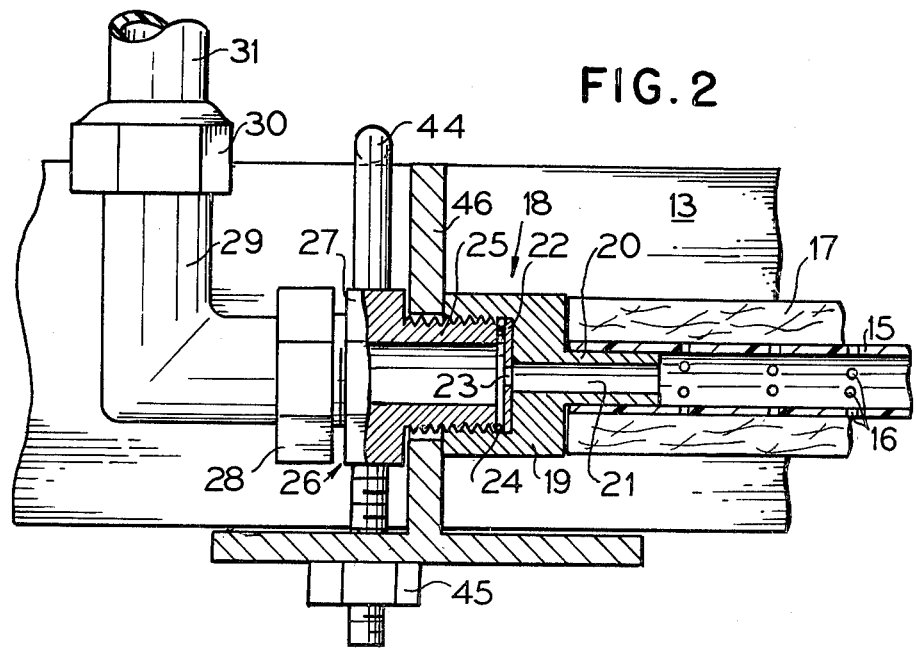
FIG. 2 is a broken-away, fragmentary cross-sectional view of a hose connection at an individual applicator station for the assembly of FIG. 1.
Figure 4:
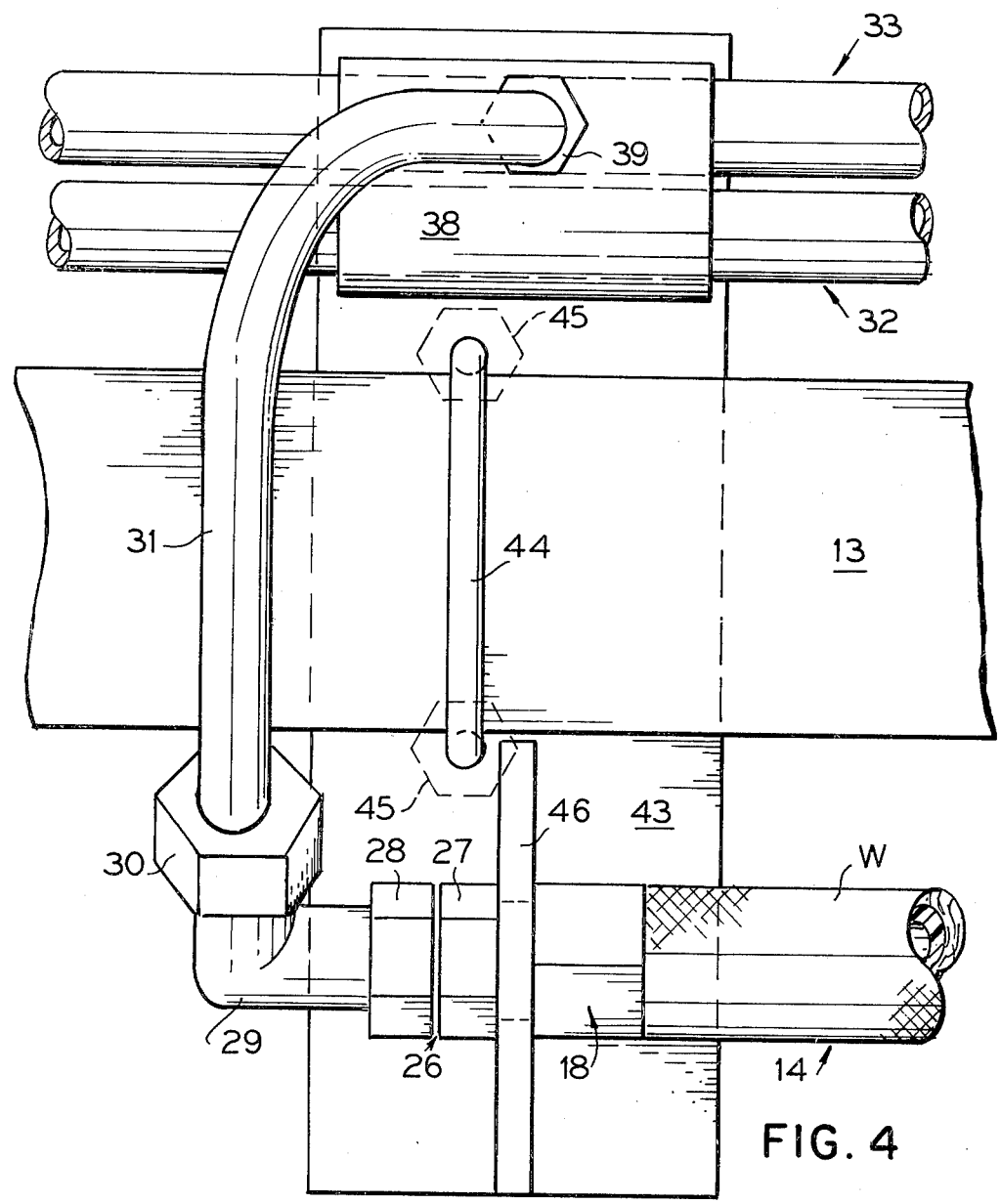
FIG. 4 is a broken-away, fragmentary plan view of an individual applicator station, its connection to the support bar, and its hose coupling to one of the common flow pipes for the assembly of FIG. 1.

With reference to FIGS. 1, 2, and 4, each applicator station 14 contains an exposed wick member W by which the liquid chemical is wiped on target vegetation. Each wick W includes a transversely elongated hollow tube 15 having a plurality of random radial openings 16 permitting flow communication between the interior and exterior of the tube 15. The tubes 15 may be made of plastic and each are covered with a concentric sleeve of cloth or rope-like fabric 17, intended to become saturated with herbicide liquid. The opposed ends of the tube 15 serve respectively as flow inlet and outlet ends.

Flow connection fittings are similarly arranged at the tube inlet and outlet ends such that only one end fitting need be described. FIGS. 2 and 4 illustrate the flow fitting for an outlet end of a tube. Each end of the tube is fitted with a coupling 18 having an enlarged bolt portion 19 with a threaded counterbore and an opposed reduced diameter nipple 20 which is frictionally received within the interior diameter of the tube 15. A flow passage 21 extends from the counterbore in the bolt portion through the nipple to provide flow communication with the interior of the tube 15.

Loosely positioned within the counterbore of the coupler 18 is a flow restrictor 22 in the form of a donut-shpaed plate or washer having a circular opening 23 which is relatively constricted as compared to the diameter of the passage 21. The restrictor plate 22 is loosely positioned in the coupler 18, which is disposed for disassembly, so as to be a selectively replaceable interchangeable unit. By interchanging plates 22 having different size circular openings 23, the flow restrictor 22 is able to be preselected as desired. A restrictor 22 is preferably used at both the inlet coupler and outlet coupler ends of the tube 15 for controllably setting supply pressure and flow rate of liquid entering the tube hollow in the case of the inlet coupler and controllably defining the back pressure and exit flow rate of the liquid in the case of the outlet coupler. The restrictor plate 22 is held in place in the counterbore by means of a friction ring 24 disposed between the restrictor and the free end of a threaded pipe portion 25 which is engaged in the counterbore threads.

Threaded pipe 24 defines one end of a conventional pipe connector piece 26. Adjacent the threaded pipe portion 24 is a raised wall portion 27 and spaced rearward of the wall 27 is a joinder section 28 which sealably engages the free end of a L-shaped pipe 29. The opposed, upper end of the L-shaped pipe 29 is provided with a coupler bolt 30 for sealably receiving one end of a flexible hose 31.

With reference to FIGS. 1 and 4, there is provided two side-by-side liquid manifold assemblies 32 and 33 each in the form of interconnected pipe segments positioned longitudinally of the support bar 13 on the other side of the bar from the wick stations 14. The interconnected pipe segments may be in the form of plastic tubing. At longitudinal spaced intervals along the length of the manifolds 32 and 33, there are mounted blocks 38 which serve to interconnect adjacent pipe segments. The blocks 34 contain two side-by-side parallel flow conduits, each of which serves to interconnect adjacent pipe segments of a corresponding manifold 32 or 33.

The manifold pipe assembly 32 serves to feed or supply liquid chemical from the tank 12 to all the wick stations 14. The manifold 32 is connected to a flow line 35 extending between the bottom of the tank 12 and an appropriate inlet port formed on the manifold 32. Positioned along the flow line 35 is a low pressure pump 36 driven by a rotary electric motor 37 powered from the tractor battery. The pump 36 serves to pressurize the supply of liquid chemical to the feed manifold 32. The hoses 31 of the connector fittings disposed at the inlet ends of the wick tubes 15 have their free ends sealably engaged in certain tap holes formed in associated blocks 34. These tap holes communicate with the flow through supply manifold 32. Similarly, as shown in FIGS. 2 and 4, the hoses 31 of the connector fittings disposed at the outlet ends of the wick tubes 15 have their free ends sealably engaged in certain tap holes 39 formed in associated blocks 34. These tap holes 39 communicate with the flow through return manifold 33.

The recycled liquid is thus passed through the outlet fittings into the return manifold 33. The return manifold 33 has connected to it a flexible hose 40 extending between an appropriate outlet formed on the manifold 33 and an opening in the top of the tank 12. An on/off valve 41 is mounted in the return hose 40. The valve 41 may be manually operable via a hand lever 42.

For supporting the connector fittings at opposed ends of each of the wick tubes 15 and also for supporting the manifold connector blocks 38 on the other side of the bar 13, there are provided a plurality of axially extending bracket plates 43. These plates 43 extend perpendicularly of the longitudinal axis of the bar 13 and extend outward beyond the opposed front and back side surfaces of the bar 13. The bracket plates 43 are preferably mounted flush against the bottom surface of the bar, so the wicks W are the closest mounted surfaces to the weed targets. The plates 43 are held at transversely spaced intervals along the bar by means of U-shaped clamps 44 having threaded free ends which extend through suitable bolt holes formed in the bracket plates and receive bolt members 45 for clamping the bracket plates against the bar. Extending vertically of the forward overhanging surface of each of the bracket plates 43 is an ear mounting plate 46 having an opening for receiving the connector threaded extension 25 therethrough. As the connector portion 25 is threaded in the coupler counterbore, the coupler bolt 19 and the enlarged stop surface 27 formed on the connector 26 frictionally clamp against opposed side surfaces of the ear plate 46 for holding the connector fittings rigid in relation to the bar 13.

Figure 3:
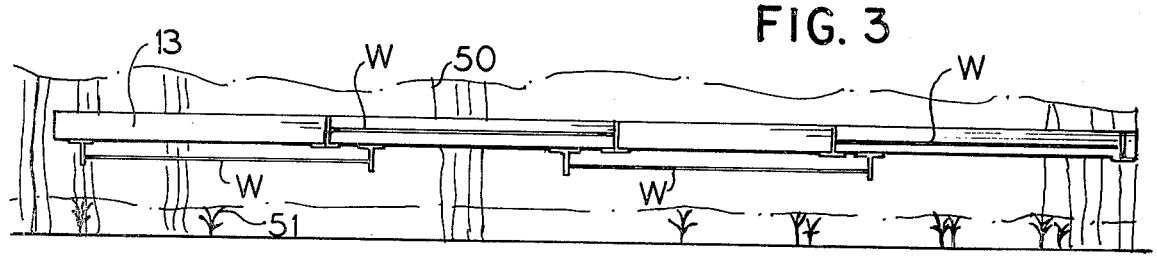
FIG. 3 is a schematic front side view of the arrangement of individual applicator stations along the support bar of the assembly of FIG. 1.

Operation of the wick applicator assembly 10 is as follows. With reference to FIGS. 1 and 3, the wick members W are positioned forwardly of the leading edge of the bar 13 in lengthwise overlapping relationship with one another in order to prevent treatment gaps along the length of the bar. Overlapping is brought about by alternately facing the mounting ears 46 for each consecutive wick W downwardly or upwardly relative to the longitudinal axis of the bar 13. Accordingly, the downwardly facing ear plates 46 position the wicks W beneath the wicks supported between the upwardly facing ear plates. The height of the bar assembly 13 is adjusted so that the tops of the weeds 50, which typically extend above the height level 51 of the feed crop especially in early growth stages, engage against the outer surfaces of the wicks W. The tractor is then driven through the crop for direct contact application of the liquid chemical weed killer. If the weeds are short and intermingled with the crop, then the bar assembly 13 may be set at a height from the ground such that both the crop and weeds are engaged by the wick surfaces, in which case a herbicide may be chosen which acts upon the weeds but not upon the crop.

Before beginning treatment, the wicks W are quick charged with liquid chemical by operation of the feed pump 36 with the return valve 41 set in a closed condition until sufficiently saturated, after which the return valve is opened and the applicator assembly 10 is conducted through the field crop. This quick charging step may also be performed to flush the fabric coverings 17 about the wick tubes 15, such as with water, enabling the wicks W to be self-cleaning for longer life. During passage of the applicator 10 through the crop being treated, tilting of the support bar 13 from the horizontal plane does not disrupt liquid flow to each of the wicks W, as may occur in static flow systems for wick applications such as disclosed in U.S. Pat. No. 4,187,638, due to pump head in the feed manifold 32. Liquid passes from the common feed manifold 32 through the inlet connection hoses and pipe fittings into the interior of the porous tubes 15. A portion of the liquid passing through the tubes 15 seeps through the tube openings 16 for saturation of the fabric coverings 17. As the wicks W are passed in contact with the target weeds, they wipe liquid chemical onto the weeds for weed treatment. A portion of the liquid flow through the tubes passes through the outlet pipe fittings and hoses to the common return manifold 33 from which this excess liquid is returned through the flow line 40 back into the tank 12.

If one or more of the wicks W are not found to be sufficiently saturated at the given supply pressure in the manifold 32, the corresponding outlet restrictor plates 22 may be replaced with restrictors having relatively smaller orifices to increase the back pressures in the tubes 15 until the wicks W achieve acceptable wetness. If one or more of the wicks W is determined to be too wet, such as to the point where dripping of the liquid chemical onto the crops or ground is a hazard, the amount of liquid flow entering the tubes 15 may be reduced by replacing the inlet end restrictor plate with a restrictor having a smaller orifice. Thus, the restrictor plates serve as independent means for controlling the saturation level of each wick W in the applicator assembly, irregardless of the density of the fabric layer 17 covering the wick tube 15. Positive saturation control enables the wick treatment application to be set for a desired transport vehicle speed and allows precise calibration of the amount of liquid chemical disposed on target vegetation by the wicks W as required for given weed species. By virtue of the parallel flow relationship of the wicks W to one another, a few selected wicks W may have saturation levels greater than the remaining wicks W without disrupting the overall efficacy of the treatment process.

The replaceable restrictor plates 22 described above are illustrative of one type of adjustable flow restrictor means which may be used in accordance with the invention for discretely controlling liquid flow to and from the individual tubes 15. Other adjustable restrictor means, such as variable valve devices, set in the individual wick inlet and outlet fluid coupling fittings are also within the comtemplation of the invention.

The invention wick applicator construction enables wicks W to be easily installed and replaced by virtue of the disconnectable end fittings disposed on the wick tubes 15. In contrast to such rope wick applicator assemblies as disclosed in U.S. Pat. No. 4,187,638 which rely on capillary flow to saturate the ropes, the wicks W are saturated uniformly throughout their lengths. It is further within the contemplation of the present invention to permit shaping of the wicks W as necessary to conform to unusual application techniques, such as wiping under overhanging tree limbs, in ditch banks, or overhead wiping.

The sleeve coverings 17 about the wick tubes 15 are preferably made of suitable fabric capable of absorbing and retaining or soaking liquid. This fabric may be cloth, synthetic sponge, or rope weave material.

Although various minor modifications may be suggested by those versed in the art, it should be understood that we wish to embody within the scope of the patent warranted hereon all such modifications as reasonably and properly come within the scope of our contribution to the art.

We claim as our invention:

1. Apparatus for applying liquid chemical to plants comprising:
    a support framework adapted to be connected to a vehicle and having a bar extending in a direction generally transverse to the direction of travel of said vehicle,
    a source of liquid chemical mounted on said framework,
    a first manifold means extending along the length of said bar for feeding liquid from said source, including a pump for pressurizing said liquid being fed,
    a second manifold means extending along the length of said bar for returning liquid to said source, and
    a series of discrete wicks supported along one face of said bar, each wick separately comprising a porous, saturable hollow body with an inlet means connecting one end of said hollow body to said first manifold means and an outlet means connecting the opposed end of said tube to said second manifold means each inlet and outlet means for each respective body having selectable flow restrictors to independently preselectively control the level of saturation of said body.

2. The apparatus of claim 1, wherein each wick body comprises a fabric covering concentric about a porous tube.

3. The apparatus of claim 1, wherein said restrictor means are in the form of replaceable plates having central openings.

4. The apparatus of claim 1, wherein said second manifold means includes a valve having a close position to permit quick charging of said wicks.

5. The apparatus of claim 1, wherein said wicks are in consecutive lengthwise overlapping relation.

6. The apparatus of claim 1, wherein each said wick is supported on said bar between longitudinally spaced brackets and further comprises threaded couplers releasably fastened respectively at the opposed ends of said tube, said couplers threadably engaging with connector portions of said inlet and outlet means respectively and fixedly clamping said corresponding bracket therebetween.

7. A wick-type herbicide application assembly comprising:
    a supporting framework adapted to be connected to a vehicle,
    a tank associated with said framework for holding a supply of liquid,
    a first manifold connected to said tank for conducting liquid from said tank, a second manifold connected to said tank for returning liquid to said tank, a plurality of discrete wick lengths, each comprising a porous tube and a rope-like fabric in fluid connection at one end with said first manifold and at the other end with said second manifold, such that said tubes are in parallel flow relation with one another, means mounting said wick lengths along a lower portion of said framework, a pump means in said first manifold for pressurizing liquid flow through said manifolds and tubes and selective flow restrictors between the corresponding ends of said tubes and said first and second manifolds to independently preselectedly control the level of saturation of each wick length.

8. The apparatus of claim 7, wherein each said porous tube is covered with a concentric fabric sleeve.

9. The apparatus of claim 7, further comprising disconnectable inlet fluid coupler means between said first manifold and said one end of each tube and disconnectable outlet fluid coupler means between said second manifold and said other end of each tube, said flow restrictors being mounted for selective replacement in said inlet and outlet fluid coupler means.

10. A wick applicator for direct contact application of liquid chemical to target vegetation comprising:

a porous tube having an inlet means with a passage for conducting liquid chemical into said tube and outlet means with a passage for conducting liquid chemical from said tube, a fabric sleeve concentrically covering said tube for becoming saturated with liquid chemical seeping from said tube, and selective flow restrictors respectively associated with said tube inlet and outlet means for preselectively controlling the flow of liquid chemical through said tube and the level of saturation of said sleeve.

11. The wick applicator of claim 10, wherein said restrictors are replaceable plates having central openings of relatively reduced diameter in relation to said inlet and outlet means passages.

12. A wick applicator assembly having a tank containing a supply of liquid chemical, a recirculating flow means for conducting liquid chemical under pressure from said tank through a feed manifold and returning liquid chemical to said tank through a return manifold, and a plurality of discrete wick means each having an elongated porous tube with an inlet means in flow communication with said feed manifold and an outlet means in flow communication with said return manifold, such that said plural wick means are in parallel flow relation with one another, a fabric sleeve concentrically covering each said tube for becoming saturated with liquid chemical seeping from said corresponding tube, and selective restrictor means in at least one of said inlet and outlet means for each separate tube.

13. The wick applicator assembly of claim 12, wherein said restrictor means are in the form of replaceable plates having central openings.

14. A method of applying a liquid chemical to vegetation comprising:

providing a plurality of discrete wicks serially arranged along the length of a support bar, each said wick comprising a porous tube having inlet and outlet end openings and concentrically covered by a fabric sleeve, supplying respective parallel flows of pressurized liquid chemical from a feed manifold means to the inlet end openings of said tubes, receiving respective parallel flows of liquid chemical in a return manifold means from the outlet end openings of said tubes, selectively controlling the flow rate of liquid chemical through each said tube independently of the other tubes at each said tube's inlet and outlet end openings to respectively set the level of saturation for the sleeve of each said tube, and applying the liquid chemical to vegetation by moving said support bar below the tops of said vegetation in a direction transverse to its length to engage the vegetation with said wick sleeves.

* * * * *